(12) United States Patent
Kaneda et al.

(10) Patent No.: US 6,388,838 B1
(45) Date of Patent: May 14, 2002

(54) TAPE CARTRIDGE

(75) Inventors: Hiroshi Kaneda; Motohiko Shima; Masatoshi Okamura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/550,652

(22) Filed: Apr. 17, 2000

(30) Foreign Application Priority Data

May 11, 1999 (JP) .......................................... 11-129774

(51) Int. Cl.[7] .............................................. G11B 15/66
(52) U.S. Cl. .................................... 360/132; 242/332.4
(58) Field of Search .............................. 360/132, 343.2, 360/338, 338.1, 338.2, 348, 348.1, 348.3; 242/60, 95, 96.5

(56) References Cited

U.S. PATENT DOCUMENTS 6,003,802 A * 12/1999 Eaton et al. .............. 242/332.4
6,092,762 A * 7/2000 Aaron ........................ 242/899
6,264,126 B1 * 7/2001 Shima et al. ............... 242/343

* cited by examiner

*Primary Examiner*—William Korzuch
*Assistant Examiner*—Christopher R Beacham
(74) *Attorney, Agent, or Firm*—Drinker Biddle & Reath LLP

(57) ABSTRACT

A tape cartridge comprising a housing, a single tape reel around which a length of tape is wound and which is turnably held within the housing, a leader to which the beginning of the tape is secured, and a tape draw-out member by which the tape is pulled out through an opening formed in the housing into a recorder, characterized in that the leader is composed of a pin member, an elastomer clamp which is fitted around the pin member, a metal clamp fitted around the elastomer clamp, and a highly slippery member of synthetic resin placed between the elastomer clamp and metal clamp.

2 Claims, 3 Drawing Sheets

Prior Art

TAPE CARTRIDGE

BACKGROUND OF THE INVENTION

1. Field of the Invention

This invention relates to a single-reel type tape cartridge for magnetic recording-reproducing apparatus.

2. Prior Art

Tape cartridges of the type using a single reel have already been proposed, e.g., in Japanese Patent Application Kokai No. 58-169380. FIG. 3 is a plan view of a single-reel type cartridge 100 disclosed in the specification of the above-mentioned application. A housing 102 is shown containing a length of magnetic tape 106 wound round a single reel consisting of a turnable hub 104 and a flange 108. Housing 102 has an opening 160 formed at one corner, where a block-receiving recess 118 is provided and a leader block 116 for tape insertion is removably fitted in the recess. Leader block 116 has a groove 150 in which the beginning of magnetic tape 106 is secured in position with an engaging pin 152. On the outer side of leader block 116 is formed another groove 154 to receive securely a draw-out pin which comes out of a recording-reproducing apparatus (hereinafter referred to as a "recorder") and draws out leader block 116 from the housing.

When cartridge 100 is used, an automatic loader of the recorder operates to drive the draw-out pin (not shown) first into groove 154 and into engagement with leader block 116. The pin then draws leader block 116 out, puts it in a position along a given tape path of the recorder, and eventually accommodates leader block 116 fixedly in a recess provided along the periphery of the hub of a take-up reel of the recorder. When the tape is to be rewound, leader block 116 is brought back to the position shown in the opening of cartridge 100 by way of a route reverse to that described above.

In the tape cartridge of the type described in the Patent Application Kokai No. 58-169380, the leader end of the tape is fixed to leader block 116 with the aid of pin 152 of soft synthetic resin. Since it is desirable that pin 152 be made of a material easy to fit in the groove of the leader block and which is capable of tightly retaining the tape, the material in common use has been an elastomer.

In the conventional tape cartridge, as described above, the beginning of the tape is fixed to leader block 116. The leader block is designed to enter a recorder to constitute a part of the periphery of a reel onto which the tape is to be taken up. For that reason the block has to be machined with such high precision that providing every cartridge with the block is not economically justifiable. To avoid the cost disadvantage, it might be considered possible as an alternative to affix the beginning of the tape to a pin-like leader, while the function of a leader block is transferred to the recorder, so that the cartridge can utilize only the leader for the purpose of drawing the tape out. For such an arrangement, however, the synthetic resin pin referred to above cannot be used because of its inadequate mechanical strength.

If the pin-like leader is composed of a pin member round which the beginning of the tape is wound securely and a C clamp of an elastomer which is fitted around the pin member, the clamp is still too soft to provide the firm grip required. For positive fixing, it would further be necessary to fit a metal clamp (C-shaped with partial notches) around the C-clamp.

However, an elastomer C-clamp is soft and little slippery, and causes difficulty in fitting a metal clamp around it.

In addition, elastomer clamps absorb the vibration inside a parts feeder and do not lend themselves to automatic assembling.

SUMMARY OF THE INVENTION

The present invention provides a tape cartridge comprising a housing, a single tape reel around which a length of tape is wound and which is turnably held within the housing, a leader to which the beginning of the tape is secured, and a tape draw-out member by which the tape is pulled out through an opening formed in the housing into a recorder, characterized in that the leader is composed of a pin member, an elastomer clamp member which is fitted around the pin member, a metal clamp member fitted around the elastomer clamp member, and a highly slippery member of synthetic resin placed between the elastomer and metal clamp members.

A highly slippery member of synthetic resin put between an elastomer clamp member and a metal clamp member improves the sliding contact between the latter two members and facilitates the fixing of a tape to a leader.

Moreover, fitting a highly slippery synthetic resin member over an elastomer clamp member and combining them integrally in advance renders it possible to use a parts feeder, make the tape clamping easy, and improve the efficiency of assembling single-reel type tape cartridges.

DESCRIPTION OF THE PREFERRED EMBODIMENT

An embodiment of the invention will now be described in detail with reference to the accompanying drawings.

Figure 1:
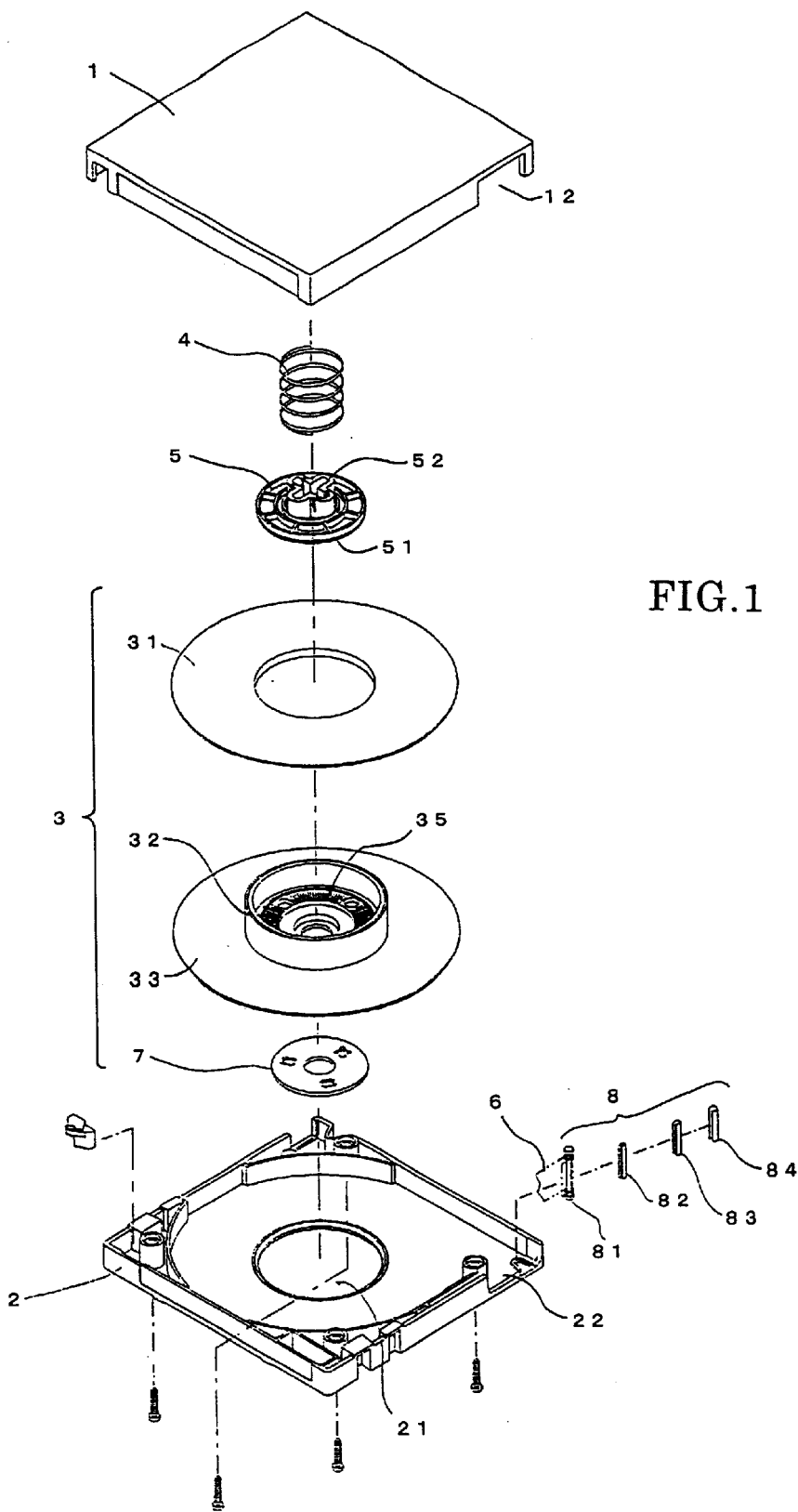
FIG. 1 is an exploded view of a tape cartridge embodying the present invention.

Referring to FIG. 1, there is shown a cartridge turnably containing a tape reel 3 on which a length of tape is wound in a housing consisting of an upper casing 1 and a lower casing 2.

Lower casing 2 has an opening 21 into which a drive shaft of a recorder is to be inserted. In addition, upper and lower casings 1, 2 are formed respectively, with openings 12, 22 through which the tape is to be pulled out.

Tape reel 3 consists integrally of an upper flange 31, a hub 32 formed in one piece with a lower flange 33, and a metal disk 7 of a soft magnetic material that fits to the underside of hub 32. Metal disk 7 has teeth (not shown) formed around its edge and adapted to engage with a drive shaft of a recorder, whereby it is magnetically attracted to turn tape reel 3. There is no member to fix the tape in place, because the tape is directly affixed to the outer periphery of the hub with water or the like.

Hub 32 has a tooth-like part 35 formed on its inner surface to be in mesh with a reel brake 5, which is axially urged by a spring 4 into the meshed position but does not turn itself, so as to prevent unwanted turning of tape reel 3 when the latter is not in use.

Reel brake 5 has a tooth-like part 51 formed on its underside in mesh with the corresponding part 35 of hub 32. The reel brake is normally urged in the braking position by brake spring 4. An upward projection 52 of reel brake 5 is positively movable up and down between the braking position and a brake release position by means of a positioning part (not shown) formed on the inner surface of upper casing 1. Once the cartridge is loaded in a recorder, a magnetized sucking plate that constitutes a part of the drive shaft of the recorder ascends to attract metal disk 7 while, at the same time, a brake release member of the recorder lifts the reel brake 5, against the urging of spring 4, out of engagement with tape reel 3, setting the reel free to turn.

The leader end of tape 6 is fixed to a leader 8 and, when the cartridge is inserted into a recorder, leader 8 is held in position by a holder of the recorder so that the tape can be pulled out.

Figure 2:
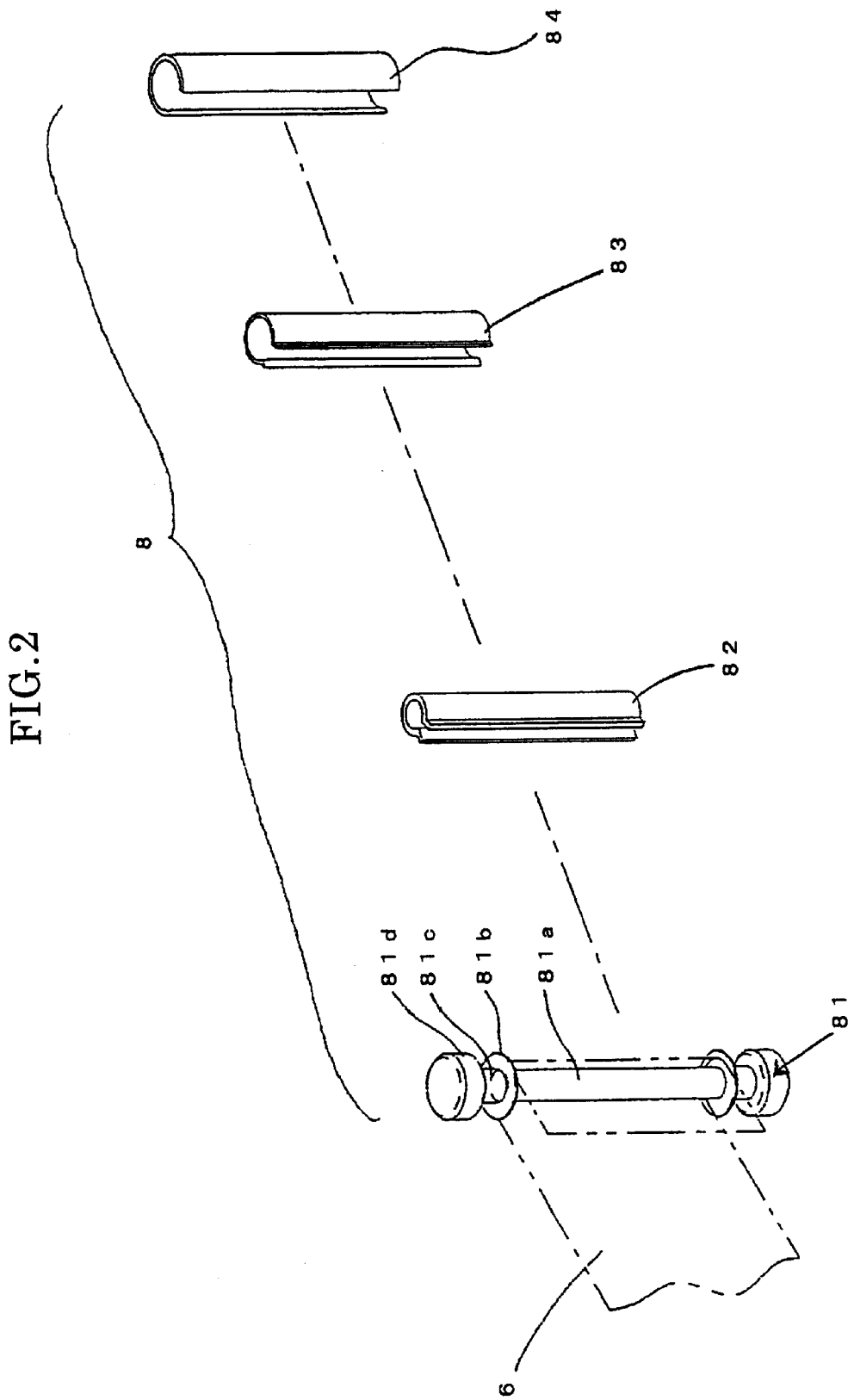
FIG. 2 is an exploded view of a leader.
Figure 3:
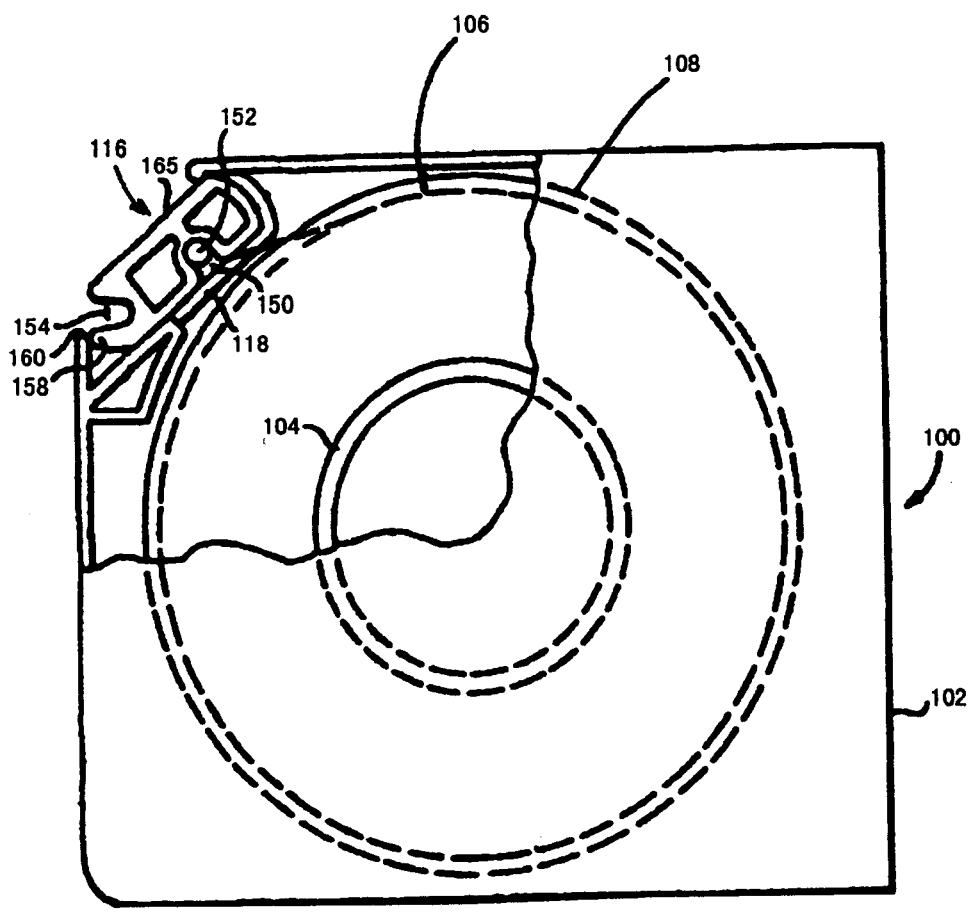
FIG. 3 is a plan view of a conventional single-reel type tape cartridge.

As shown in FIG. 2, leader 8 is made up of a pin member 81, a C-shaped elastomer clamp 82, a high-slip resin member 83, and a metal clamp 84. Pin member 81 has a tape-holding part 81a where the tape end is secured in place, a pair of first flanges 81b formed at both ends of the tape-holding part, neck parts 81c to be engaged with a draw-out member of a recorder, and a pair of second flanges 81d. C-shaped elastomer clamp 82 has an inlet slot of a width large enough for the clamp to fit easily over the tape-holding part 81a of pin member 81. Likewise high-slip resin member 83 and metal clamp 84 have wide enough inlet slots with which to fit smoothly over elastomer clamp 82 and high-slip resin member 83, respectively.

Tape 6 is partly wound round tape-holding part 81a and is secured in place as C-shaped elastomer clamp 82 substantially as long as the part 81a is fitted over that part. Then high-slip resin member 83 is fitted over C-shaped elastomer clamp 82. Elastomer clamp 82 itself has good elasticity and friction property to fix the tape in place, but its low slipperiness makes it difficult for metal clamp 84 to fit directly onto the elastomer clamp. It is for this reason that the highly slippery member is put between the two clamps to facilitate the assembling. For the material of high-slip resin member 83, polyacetal (POM), nylon (PA), ultrahigh-molecular-weight polyethylene (UHMPE) or the like is preferred.

As regards the order of assembling the parts of leader 8, it is advisable to combine each elastomer clamp 82 with a high-slip resin member 83 immediately after the molding of the clamp. The combination in advance ensures satisfactory assembling work by the use of parts feeders. (Each feeder supplied with a large number of parts at random align and feed them neatly in a given direction by virtue of vibration, but elastomer parts absorb the vibration and cannot be handled as easily as ordinary metallic and plastic parts.)

According to the invention, as described above, a highly slippery member of synthetic resin is placed between an elastomer clamp member and a metal clamp member to facilitate fixing of a tape to a leader of a tape cassette.

Moreover, fitting a highly slippery synthetic resin member over an elastomer clamp member and combining them integrally in advance renders it possible to use a parts feeder and improve the assembling efficiency.

What is claimed is:

1. A tape cartridge comprising a housing, a single tape reel around which a length of tape is wound and which is turnably held within the housing, a leader to which the beginning of the tape is secured, and a tape draw-out member by which the tape is pulled out through an opening formed in the housing into a tape recorder, characterized in that the leader is composed of a pin member, an elastomer clamp which is fitted around the pin member, a metal clamp fitted around the elastomer clamp, and a highly slippery member of synthetic resin placed between the elastomer clamp and metal clamp.

2. The tape cartridge of claim 1, wherein the highly slippery synthetic resin member is made of a polyacetal resin, nylon resin, or ultrahigh-molecular-weight polyethylene.

* * * * *